United States Patent
Fujikura et al.

(10) Patent No.: US 12,081,002 B2
(45) Date of Patent: Sep. 3, 2024

(54) WIRE HARNESS

(71) Applicant: SUMITOMO WIRING SYSTEMS, LTD., Yokkaichi (JP)

(72) Inventors: Masaya Fujikura, Yokkaichi (JP); Takao Suga, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 388 days.

(21) Appl. No.: 17/441,545

(22) PCT Filed: Sep. 24, 2019

(86) PCT No.: PCT/JP2019/037174
§ 371 (c)(1),
(2) Date: Sep. 21, 2021

(87) PCT Pub. No.: WO2020/194798
PCT Pub. Date: Oct. 1, 2020

(65) Prior Publication Data
US 2022/0181860 A1 Jun. 9, 2022

(30) Foreign Application Priority Data

Mar. 27, 2019 (JP) ................. 2019-060727

(51) Int. Cl.
*H02G 3/04* (2006.01)
*B60R 16/02* (2006.01)
*H02G 3/00* (2006.01)
*H02G 3/30* (2006.01)
*H02G 3/32* (2006.01)

(52) U.S. Cl.
CPC ....... *H02G 3/0462* (2013.01); *B60R 16/0215* (2013.01); *H02G 3/266* (2013.01); *H02G 3/305* (2013.01); *H02G 3/32* (2013.01)

(58) Field of Classification Search
CPC ... H02G 3/04; H02G 3/30; H02G 3/32; B60R 6/0215
See application file for complete search history.

(56) References Cited

U.S. PATENT DOCUMENTS 6,376,777 B1 * 4/2002 Ito ................. H02G 3/088
174/152 G
10,439,376 B2   10/2019 Sugino
(Continued)

FOREIGN PATENT DOCUMENTS

JP  H02-034888 U   3/1990
JP  2013-252024 A  12/2013
(Continued)

OTHER PUBLICATIONS

Dec. 10, 2019 International Search Report issued in International Patent Application No. PCT/JP2019/037174.

*Primary Examiner* — Paresh Paghadal
(74) *Attorney, Agent, or Firm* — Oliff PLC

(57) ABSTRACT

A wire harness including: a first electric wire; a first tube in which the first electric wire is housed; a clamp that holds the first tube; and a first tape having a surface that is less likely to slide against the clamp than a surface of the first tube, wherein the clamp is brought into contact with the first tape that is wound onto and fixed to an outer circumferential surface of the first tube, and is attached thereto.

17 Claims, 8 Drawing Sheets

(56) References Cited

U.S. PATENT DOCUMENTS

| | | | |
|---|---|---|---|
| 2003/0207106 A1* | 11/2003 | Nakamura | C09J 7/385 |
| | | | 428/355 EN |
| 2007/0200034 A1* | 8/2007 | Urzua | H02G 3/30 |
| | | | 248/68.1 |
| 2015/0083462 A1* | 3/2015 | Yoshida | F16L 55/035 |
| | | | 174/136 |
| 2019/0386472 A1 | 12/2019 | Sugino | |

FOREIGN PATENT DOCUMENTS

| | | |
|---|---|---|
| JP | 2017-200375 A | 11/2017 |
| JP | 2018-101462 A | 6/2018 |

\* cited by examiner

WIRE HARNESS

BACKGROUND

The present disclosure relates to a wire harness.

JP 2018-101462A discloses a wire harness provided with a clamp that is to be fixed to a vehicle body while holding a tubular member such as a metal pipe inside which an electric wire is housed.

SUMMARY

If the clamp is not provided with a structure for restricting the rotation of the tubular member, the tubular member slides against the clamp and rotates, thus making it difficult to attach the clamp to a vehicle. In particular, if the tubular member includes a bent portion, turning force is likely to act on the tubular member, and thus the tubular member is likely to slide against (rotate relative to) the clamp.

An exemplary aspect of the disclosure provides a wire harness that can improve an effect of suppressing the sliding of the tubular member relative to the clamp.

A wire harness of the present disclosure includes: a first electric wire; a first tube in which the first electric wire is housed; a clamp that holds the first tube; and a first tape having a surface that is less likely to slide against the clamp than a surface of the first tube, wherein the clamp is brought into contact with the first tape that is wound onto and fixed to an outer circumferential surface of the first tube, and is attached thereto.

With the present disclosure, it is possible to provide a wire harness that can improve an effect of suppressing the sliding of the tube against the clamp.

DETAILED DESCRIPTION OF EMBODIMENTS

Figure 1:
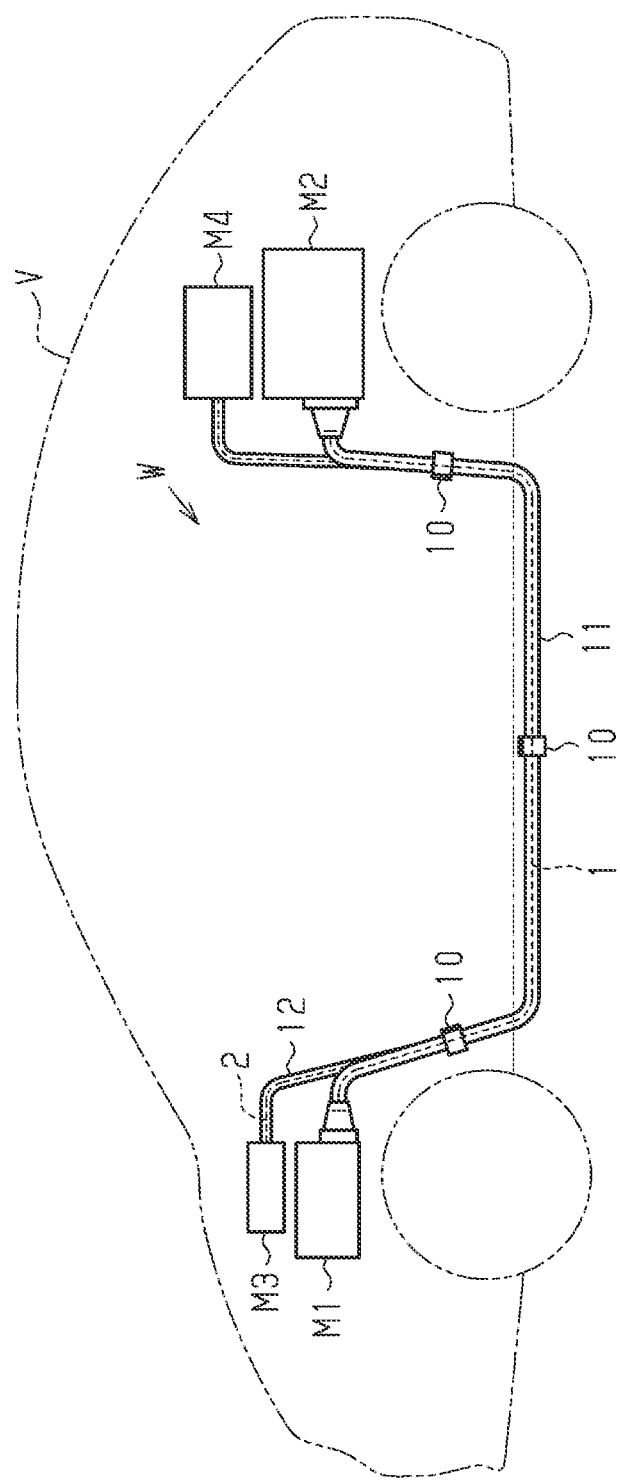
FIG. 1 is a schematic configuration diagram illustrating a typical exemplary configuration of a wire harness according to an embodiment.

Description of Embodiments of the Present Disclosure

First, embodiments of the present disclosure will be listed and described.

A wire harness of the present disclosure is

[1] a wire harness that includes: a first electric wire; a first tubular member in which the first electric wire is housed; a clamp that holds the first tubular member; and a first tape member having a surface that is less likely to slide against the clamp than a surface of the first tubular member, wherein the clamp is brought into contact with the first tape member that is wound onto and fixed to an outer circumferential surface of the first tubular member, and is attached thereto.

The first tape member having a surface that is less likely to slide against the clamp is wound onto and fixed to the outer circumferential surface of the first tubular member, and the clamp is attached so as to be in contact with the surface of the first tape member. Accordingly, compared with the case where the clamp is directly attached to the surface of the first tubular member, it is possible to improve the effect of suppressing the sliding of the first tubular member against the clamp.

[2] It is preferable that the first tape member has a surface layer that comes into contact with the clamp, and the surface layer contains polyvinyl chloride as a main component. Due to polyvinyl chloride, the surface of the first tape member is less likely to slide against the clamp, and favorable stretchability and excellent hand-tearability can be imparted to the first tape member. That is, this first tape member can apply sufficient frictional force to the clamp, and the ease of attaching the first tape member can be improved when the first tape member is wound onto and fixed to the outer circumferential surface of the first tubular member.

[3] It is preferable that the clamp includes a main body in which the first tubular member is housed, and a first protruding portion that protrudes from the main body in a longitudinal direction of the first tubular member, and the wire harness further includes a first fastening member with which the first protruding portion and the first tubular member are fastened together to press the first tape member against the first protruding portion. The first tape member is pressed against the first protruding portion of the clamp by fastening the first protruding portion and the first tubular member together with the first fastening member, and thus the frictional force applied by the first tape member to the first protruding portion of the clamp is improved. That is, it is possible to improve the effect of suppressing the sliding of the first tubular member against the clamp.

It is preferable that the first fastening member is a binding band. Examples of the first fastening member include a binding band and tape, and a binding band is less likely to be stretched than tape, and can maintain the fastening state produced by mechanical locking. That is, deterioration of a binding band is less likely to affect the fastening force compared with tape that maintains a fastening state by its stickiness. Moreover, a binding band need not be rotated around the first tubular member many times unlike rolled-up tape, and thus a small work space is sufficient for where harness assembly is performed.

[5] It is preferable that the first protruding portion has a first projection on a side opposite to a side opposed to the first tubular member. The first fastening member can be locked to the first projection, namely it is possible to restrict the first fastening member from moving from an appropriate position, and therefore, the sliding-suppressing effect of the clamp caused by the first tape member can be maintained to suppress the rotation of the first tubular member till the first tubular member is attached to a vehicle. Moreover, the area of contact between the first tape member and the first protruding portion can be secured by providing the first projection on a side opposite to the surface to be opposed to the first tubular member.

[6] It is preferable that the wire harness further includes: a second electric wire; a second tubular member in which the second electric wire is housed; and a second tape member, wherein the clamp includes a second protruding portion that protrudes from the main body in a longitudinal direction of the second tubular member, and the second tubular member is fixed to the second protruding portion by winding the second tape member around the second tubular member and the second protruding portion together. Tape serving as the second tape member is wound around the second tubular member and the second protruding portion together to fix the second tubular member to the second protruding portion, thus making it possible to more reliably suppress the rotation of the second tubular member.

[7] It is preferable that the second tape member has lower stretchability than the first tape member. Since the second tape member is wound around the second tubular member and the second protruding portion together to fix the second tubular member to the second protruding portion, there is a concern that the second tubular member rotates if the second tape member itself is stretched. In this respect, using a second tape member having low stretchability makes it possible to improve the effect of suppressing the rotation of the second tubular member.

[8] It is preferable that the second tape member includes a fabric layer that contains acetate fibers as a main component. Due to the acetate fibers, elongation resistance and flexibility are imparted to the second tape member. That is, the rotation of the second tubular member can be further suppressed, and the ease of attaching the second tape member can be improved.

[9] It is preferable that the wire harness further includes a second fastening member with which the second tape member is fastened. When the second tape member is fastened with the second fastening member, the second tubular member can be further kept from rotating by such fastening. In addition, the separation of the second tape member is suppressed, thus making it possible to maintain the effect of suppressing the rotation of the second tubular member.

[10] It is preferable that the second fastening member is a binding band. Examples of the second fastening member include a binding band and tape, and a binding band is less likely to be stretched than tape, and can maintain the fastening state produced by mechanical locking. That is, deterioration of a binding band is less likely to affect the fastening force compared with tape that maintains a fastening state by its stickiness.

[11] It is preferable that the second protruding portion has a second projection on a side opposite to a side opposed to the second tubular member. The second fastening member can be locked to the second projection, namely it is possible to restrict the second fastening member from moving from an appropriate position, and therefore, the fixation effect caused by the second tape member can be maintained to suppress the rotation of the second tubular member, for example, till the second tubular member is attached to a vehicle. Moreover, the area of contact between the second tubular member and the second protruding portion can be secured by providing the second projection on a side opposite to the surface to be opposed to the second tubular member.

[12] It is preferable that the first electric wire is a low-voltage electric wire, and the second electric wire is a high-voltage electric wire. In most cases, a high-voltage electric wire includes a core wire having a large cross-sectional area in order to suppress heat generation when an electric current flows therethrough, and thus the outer diameter of the high-voltage electric wire is likely to be larger than that of a low-voltage electric wire. That is, in most cases, a high-voltage electric wire is heavier than a low-voltage electric wire, and therefore, it is preferable to arrange a high-voltage electric wire in the second tubular member because the effect of suppressing the rotation of the second tubular member is improved by winding tape serving as the second tape member around the second tubular member and the second protruding portion together.

[13] It is preferable that the second tubular member has a larger outer diameter than the first tubular member. It is preferable that the rotation of the second tubular member having a larger outer diameter, in other words, a tubular member in which a heavy object such as a high-voltage electric wire or a large number of electric wires can be housed, is more effectively suppressed.

[14] It is preferable that the first tubular member is made of a resin, and the second tubular member is made of a metal. Metals are heavier than resins, and even have an electromagnetic shielding function. A high-voltage electric wire generates higher electromagnetic noise than a low-voltage electric wire, and therefore, it is preferable that a high-voltage electric wire is housed in the second tubular member having an electromagnetic shielding function from the viewpoint of efficiently shielding electromagnetic noise generated by a wire harness. Accordingly, it is preferable that the rotation of a tubular member that is heavier and in which a heavy object can be housed is more effectively suppressed.

[15] It is preferable that the first tubular member is a corrugated tube formed in a bellows shape in which ridge portions and valley portions are alternately repeated. The area of contact between the corrugated tube and the clamp decreases compared with that between the tubular member with a smooth outer circumferential surface and the clamp, and thus the corrugated tube is likely to rotate relative to the clamp. Accordingly, the rotation of the corrugated tube relative to the clamp can be suppressed by winding the tape member having a surface that is less likely to slide against the clamp than the surface of the corrugated tube onto the outer circumferential surface of the corrugated tube.

Details of Embodiments of the Present Disclosure

The following describes specific embodiments of a wire harness of the present disclosure with reference to the drawings. In the present disclosure, the term "main component" encompasses a meaning that other components are contained as long as the functions of the main component are not inhibited as well as a meaning that the content of the main component is 50 mass % or more, unless otherwise stated. That is, various additives such as a thermal stabilizer, an antioxidant, an ultraviolet absorber, a light stabilizer, a crystal nucleating agent, a coloring agent, an antistatic agent, an antihydrolysis agent, a lubricant, a flame retardant, and an elastomer may be contained as appropriate as long as the functions of the main component are not inhibited. Moreover, another resin composition may be contained as long as the functions of the main component are not inhibited. It should be noted that the present disclosure is not limited to these embodiments and is defined by the scope of the appended claims, and all changes that fall within the same essential spirit as the scope of the claims are intended to be included therein. A portion of the configuration may be exaggerated or simplified for illustrative reasons in the diagrams. In addition, the ratios between the dimensions of portions shown in the diagrams may be different from the actual ratios.

A wire harness W shown in FIG. 1 is installed in a vehicle V such as a hybrid car or an electric car. The wire harness W includes a high-voltage electric wire 1 included in a high-voltage circuit, and a low-voltage electric wire 2 included in a low-voltage circuit. The high-voltage electric wire 1 electrically connects a device M1 such as an inverter that is installed in the front portion of the vehicle V and a device M2 such as a high-voltage battery that is installed in the rear portion of the vehicle V. The inverter is connected to a wheel driving motor that serves as a power source for vehicle travel, generates AC power from the high-voltage battery, and supplies the AC power to the motor. The high-voltage battery can supply a voltage of several hundred volts, for example. The low-voltage electric wire 2 electrically connects a device M3 such as a fuse box that is installed in the front portion of the vehicle V and a device M4 such as a low-voltage battery that is installed in the rear portion of the vehicle V. The low-voltage battery can supply a voltage of 12 volts, for example. The wire harness W is routed passing under the floor of the vehicle V, etc., for example.

The electric wires 1 and 2 are formed in an elongated shape and extend in the front-rear direction of the vehicle V, for example. A high voltage/a large amount of electric current can be applied to the high-voltage electric wire 1. The electric wires 1 and 2 each include a core wire obtained by twisting a plurality of metal strands, and an insulating coating that covers the core wire, for example. The electric wires 1 and 2 each may be a shielded electric wire having an electromagnetic shield structure for shielding an electromagnetic wave, or a non-shielded electric wire having no shield structure. One end portion of the high-voltage electric wire 1 is connected to the device M1 via a connector, and the other end portion of the high-voltage electric wire 1 is connected to the device M2 via a connector. One end portion of the low-voltage electric wire 2 is connected to the device M3 via a terminal fitting, and the other end portion of the low-voltage electric wire 2 is connected to the device M4 via a terminal fitting. The low-voltage electric wire 2 corresponds to an example of a first electric wire, and the high-voltage electric wire 1 corresponds to an example of a second electric wire.

Figure 2:
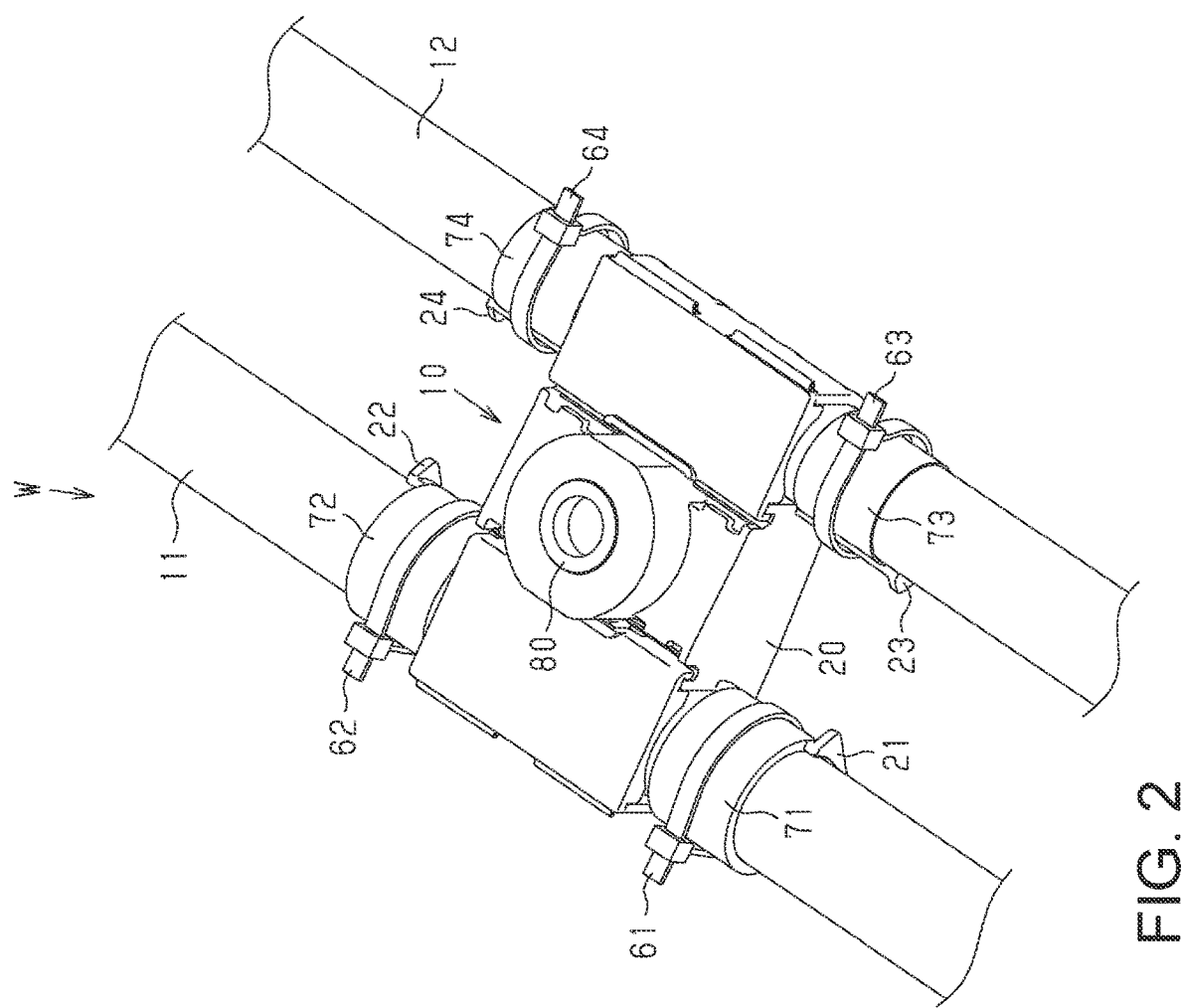
FIG. 2 is a perspective view illustrating a portion of the wire harness that is provided with a clamp.
Figure 5:
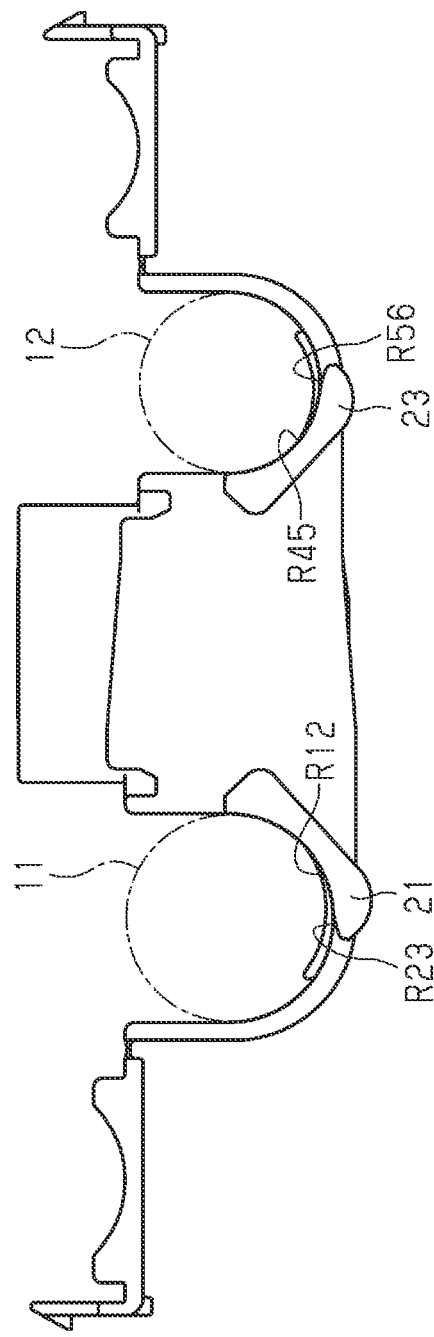
FIG. 5 is a front view illustrating the clamp.
Figure 6:
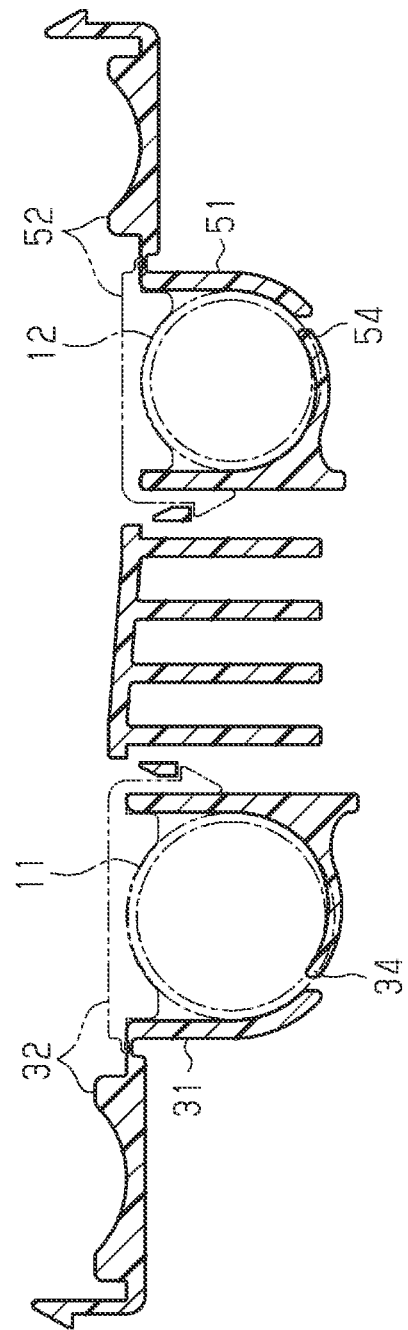
FIG. 6 is a cross-sectional view illustrating the clamp taken along line 6-6 in FIG. 4.

As shown in FIG. 2, the wire harness W includes a high-voltage pipe 11 in which the high-voltage electric wire 1 is housed, a low-voltage pipe 12 in which the low-voltage electric wire 2 is housed, and one or more clamps 10 that hold the pipes 11 and 12. The pipes 11 and 12 are made of a metal, and a metal material such as a copper-based metal material or an aluminum-based metal material can be used. The pipes 11 and 12 serve as shield structures for protecting the electric wires 1 and 2 from flying objects and waterdrops as well as protecting the electric wires 1 and 2 from an electromagnetic wave. As shown in FIGS. 5 and 6, the high-voltage pipe 11 has a larger outer diameter than the low-voltage pipe 12. The reason for this is that, in most cases, the high-voltage electric wire 1 housed in the high-voltage pipe 11 includes a core wire having a large cross-sectional area in order to suppress heat generation when an electric current flows therethrough, and thus the outer diameter of the high-voltage electric wire 1 is likely to be larger than that of the low-voltage electric wire 2. The low-voltage pipe 12 corresponds to an example of a first tubular member (first tube), and the high-voltage pipe 11 corresponds to an example of a second tubular member (second tube). The wire harness W is routed on and fixed to a predetermined portion or wiring path by attaching the clamp 10 to the pipes 11 and 12 and then fixing the clamp 10 to a fixing target on a vehicle body or the like.

Figure 3:
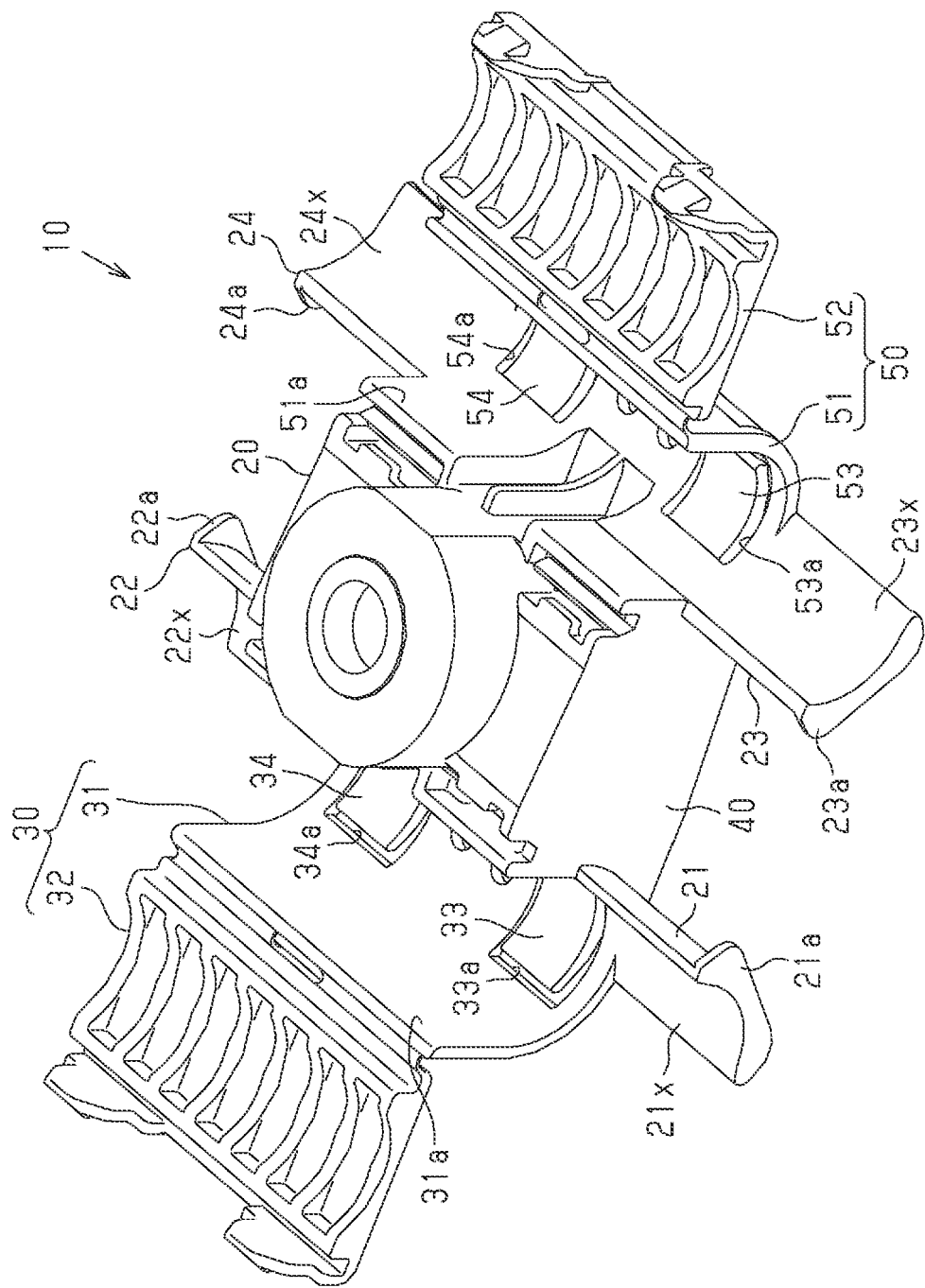
FIG. 3 is a perspective view illustrating the clamp.

As shown in FIG. 3, the clamp 10 includes a main body 20 in which the pipes 11 and 12 are to be housed, protruding portions 21 and 22 that protrude from the main body 20 in the longitudinal direction of the high-voltage pipe 11, and protruding portions 23 and 24 that protrude from the main body 20 in the longitudinal direction of the low-voltage pipe 12. The main body 20 includes a tubular portion 30 in which the high-voltage pipe 11 is to be housed, a base portion 40 adjacent to the tubular portion 30, and a tubular portion 50 in which the low-voltage pipe 12 is to be housed and that is adjacent to the base portion 40 on a side opposite to the tubular portion 30. The tubular portion 30 includes a housing portion 31 provided with an opening portion 31a through which the high-voltage pipe 11 is to be introduced, a lid portion 32 for covering the opening portion 31a, and stabilizer portions 33 and 34 for biasing the high-voltage pipe 11 toward the lid portion 32 side. The tubular portion 50 includes a housing portion 51 provided with an opening portion 51a through which the low-voltage pipe 12 is to be introduced, a lid portion 52 for covering the opening portion 51a, and stabilizer portions 53 and 54 for biasing the low-voltage pipe 12 toward the lid portion 52 side.

The stabilizer portions 33 and 34 each include a fixed end and a free end in the circumferential direction of the high-voltage pipe 11, and have a configuration in which the free end side thereof biases the high-voltage pipe 11 toward the lid portion 32 side. The stabilizer portion 33 is provided by forming a U-shaped through hole 33a in the lowermost portion of the housing portion 31. Similarly, the stabilizer portion 34 is provided by forming a U-shaped through hole 34a in the lowermost portion of the housing portion 31. The through holes 33a and 34a are provided so as to be lined up in the longitudinal direction of the high-voltage pipe 11. The inside and the outside of the tubular portion 30 are in communication with each other through the through holes 33a and 34a. The stabilizer portions 33 and 34 elastically hold the high-voltage pipe 11 in collaboration with the lid portion 32. The through holes 33a and 34a function as discharge holes for discharging liquid such as water or vent holes in the tubular portion 30.

The stabilizer portions 53 and 54 each include a fixed end and a free end in the circumferential direction of the low-voltage pipe 12, and have a configuration in which the free end side thereof biases the low-voltage pipe 12 toward the lid portion 52 side. The stabilizer portion 53 is provided by forming a U-shaped through hole 53a in the lowermost portion of the housing portion 51. Similarly, the stabilizer portion 54 is provided by forming a U-shaped through hole 54a in the lowermost portion of the housing portion 51. The through holes 53a and 54a are provided so as to be lined up in the longitudinal direction of the low-voltage pipe 12. The inside and the outside of the tubular portion 50 are in communication with each other through the through holes 53a and 54a. The stabilizer portions 53 and 54 elastically hold the low-voltage pipe 12 in collaboration with the lid portion 52. The through holes 53a and 54a function as discharge holes for discharging liquid such as water or vent holes in the tubular portion 50.

The protruding portion 21 protrudes toward one end of the high-voltage pipe 11 in the longitudinal direction from a portion that is located on one end surface of the housing portion 31 in the longitudinal direction and is continuous with the base portion 40. The protruding portion 21 has a surface 21x that is to be opposed to the high-voltage pipe 11. This surface 21x may be a concave curved surface that corresponds to or conforms to the outer circumferential surface of the high-voltage pipe 11, and may also be referred to as an "inner circumferential surface of the protruding portion 21" in the following description. The protruding portion 21 includes a projection 21a on a side opposite to the surface 21x that is to be opposed to the high-voltage pipe 11. The protruding portion 22 protrudes toward the other end of the high-voltage pipe 11 in the longitudinal direction from a portion that is located on the other end surface of the housing portion 31 in the longitudinal direction and is continuous with the base portion 40. The protruding portion 22 has a surface 22x that is to be opposed to the high-voltage pipe 11. This surface 22x may be a concave curved surface that corresponds to or conforms to the outer circumferential surface of the high-voltage pipe 11, and may also be referred to as an "inner circumferential surface of the protruding portion 22" in the following description. The protruding portion 22 includes a projection 22a on a side opposite to the surface 22x that is to be opposed to the high-voltage pipe 11. The protruding portion 21 and the protruding portion 22 each correspond to an example of a second protruding portion (second protrusion), and the projection 21a and the projection 22a each correspond to an example of a second projection. The protruding portion 23 protrudes toward one end of the low-voltage pipe 12 in the longitudinal direction from a portion that is located on one end surface of the housing portion 51 in the longitudinal direction and is continuous with the base portion 40. The protruding portion 23 has a surface 23x that is to be opposed to the low-voltage pipe 12. This surface 23x may be a concave curved surface that corresponds to or conforms to the outer circumferential surface of the low-voltage pipe 12, and may also be referred to as an "inner circumferential surface of the protruding portion 23" in the following description. The protruding portion 23 includes a projection 23a on a side opposite to the surface 23x that is to be opposed to the low-voltage pipe 12. The protruding portion 24 protrudes toward the other end of the low-voltage pipe 12 in the longitudinal direction from a portion that is located on the other end surface of the housing portion 51 in the longitudinal direction and is continuous with the base portion 40. The protruding portion 24 has a surface 24x that is to be opposed to the low-voltage pipe 12. This surface 24x may be a concave curved surface that corresponds to or conforms to the outer circumferential surface of the low-voltage pipe 12, and may also be referred to as an "inner circumferential surface of the protruding portion 24" in the following description. The protruding portion 24 includes a projection 24a on a side opposite to the surface 24x that is to be opposed to the low-voltage pipe 12. The protruding portion 23 and the protruding portion 24 each correspond to an example of a first protruding portion (first protrusion), and the projection 23a and the projection 24a each correspond to an example of a first projection.

Figure 8:
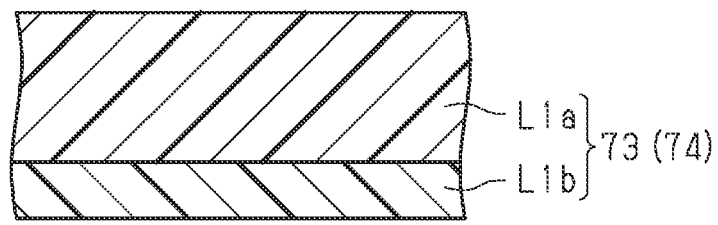
FIG. 8 is a schematic cross-sectional view of a first tape member.

Referring to FIG. 2, the wire harness W includes tape 73 having a surface that is less likely to slide against the protruding portion 23 than the surface of the low-voltage pipe 12, and tape 74 having a surface that is less likely to slide against the protruding portion 24 than the surface of the low-voltage pipe 12. The tapes 73 and 74 are wound onto the outer circumferential surface of the low-voltage pipe 12 such that the sticky layers of the tapes 73 and 74 are fixed to the outer circumferential surface of the low-voltage pipe 12, and thus the surface of the tape 73 is in contact with the protruding portion 23 while the surface of the tape 74 is in contact with the protruding portion 24. As shown in FIG. 8, the tape 73 may include a surface layer L1a and a sticky layer L1b. The sticky layer Lib sticks to or adheres to the outer circumferential surface of the low-voltage pipe 12. The surface layer L1a comes into contact with the protruding portion 23. The surface layer L1a may contain polyvinyl chloride as the main component, for example. In the example shown in the diagram, the tape 73 is vinyl tape obtained by integrally providing the sticky layer Lib on one surface of the surface layer L1a. The tape 74 may have the same structure as that of the tape 73, and a surface layer L1a of the tape 74 comes into contact with the protruding portion 24. The tapes 73 and 74 each correspond to an example of a first tape member (first tape). It should be noted that the tapes 73 and 74 each may include another layer between the surface layer L1a and the sticky layer L1b. Moreover, the wire harness W includes a binding band 63 for pressing the tape 73 against the protruding portion 23, and a binding band 64 for pressing the tape 74 against the protruding portion 24. The binding band 63 and the binding band 64 each correspond to an example of a first fastening member (first fastener).

Figure 9:
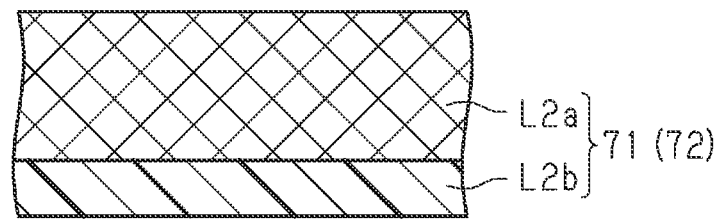
FIG. 9 is a schematic cross-sectional view of a second tape member.

Also, the wire harness W includes tapes 71 and 72 having lower stretchability than the tapes 73 and 74. The tape 71 is wound around the high-voltage pipe 11 and the protruding portion 21 together such that the sticky layer of the tape 71 is fixed thereto, and thus the high-voltage pipe 11 is fixed to the protruding portion 21. Moreover, the tape 72 is wound around the high-voltage pipe 11 and the protruding portion 22 together such that the sticky layer of the tape 72 is fixed thereto, and thus the high-voltage pipe 11 is fixed to the protruding portion 22. As shown in FIG. 9, the tape 71 may include a fabric layer L2a and a sticky layer L2b. The sticky layer L2b sticks to or adheres to the outer circumferential surface of the high-voltage pipe 11 and the outer circumferential surface of the protruding portion 21. The fabric layer L2a may contain acetate fibers as the main component, for example. In the example shown in the diagram, the tape 71 is acetate tape obtained by integrally providing the sticky layer L2b on one surface of the fabric layer L2a, for example. The tape 72 may have the same structure as that of the tape 71, and the sticky layer L2b of the tape 72 sticks to or adheres to the outer circumferential surface of the high-voltage pipe 11 and the outer circumferential surface of the protruding portion 22. The tapes 71 and 72 each correspond to an example of a second tape member (second tape). The tapes 71 and 72 each may include another layer between the fabric layer L2a and the sticky layer L2b, or another layer on a surface of the fabric layer L2a that is on a side opposite to the sticky layer L2b. The tapes 71 and 72 are not limited to acetate tape, and the fabric layers L2a of the tapes 71 and 72 may be fabric layers that contain other fibers such as polyester-based fibers as the main component, for example. Moreover, the wire harness W includes a binding band 61 with which the tape 71 is fastened, and a binding band 62 with which the tape 72 is fastened. The binding band 61 and the binding band 62 each correspond to an example of a second fastening member (second fastener).

Figure 4:
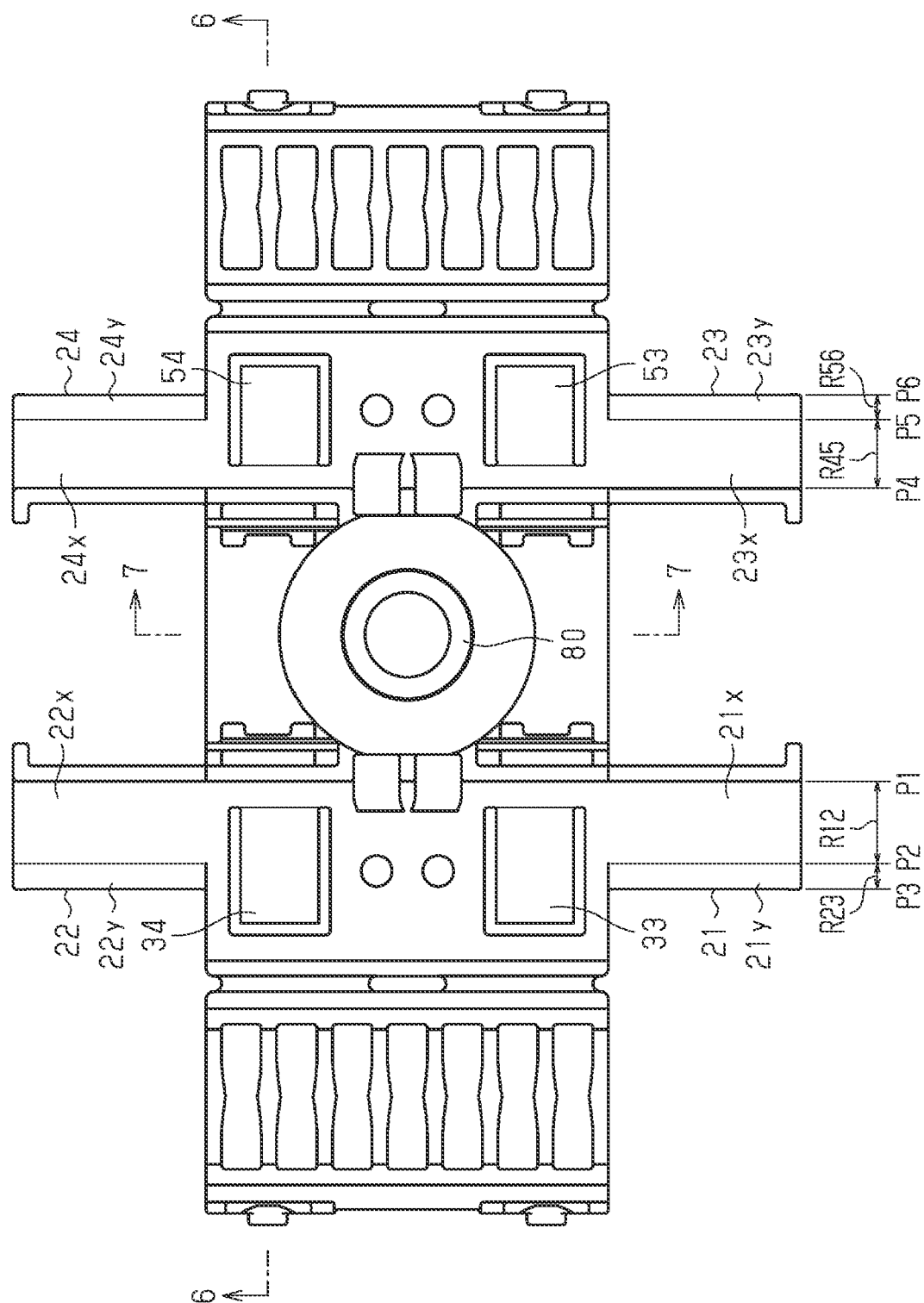
FIG. 4 is a plan view illustrating the clamp.

As shown in FIGS. 4 and 5, the protruding portions 21 and 22 have the inner circumferential surfaces 21x and 22x that are to be opposed to the high-voltage pipe 11, first end portions P1 on one side of the inner circumferential surfaces 21x and 22x in the circumferential direction, and second end portions P3 on the other side thereof in the circumferential direction. The protruding portions 21 and 22 are formed such that the heights of the inner circumferential surfaces 21x and 22x in the vertical direction continuously decrease from the first end portions P1 to the second end portions P3 in the state in which the wire harness W is installed in the vehicle V. The first end portions P1 are each located at about a 3 o'clock position in a front view, and the second end portions P3 are each located at about a half-past-six position, which passes a 6 o'clock position in the clockwise direction, in a front view. Moreover, the inner circumferential surfaces 21x and 22x of the protruding portions 21 and 22 each include, between the first end portion P1 and the second end portion P3, an intermediate position P2 that is opposed to the lowermost portion of the high-voltage pipe 11, in the state in which the wire harness W is installed in the vehicle V. The intermediate position P2 is located at about a 6 o'clock position in a front view.

In each of the inner circumferential surfaces 21x and 22x of the protruding portions 21 and 22, a region R12 between the first end portion P1 and the intermediate position P2 is formed by an ark that corresponds to the outer circumference of the high-voltage pipe 11. On the other hand, in each of the inner circumferential surfaces 21x and 22x of the protruding portions 21 and 22, a region R23 between the intermediate position P2 and the second end portion P3 is formed by a discharge promoting surface 21y or 22y whose height in the vertical direction continuously decreases from the intermediate position P2 to the second end portion P3. The regions R23 that correspond to the discharge promoting surfaces 21y and 22y each may be formed by an inclined surface whose height in the vertical direction decreases linearly, a curved surface whose height in the vertical direction decreases, for example, in a quadratic curve manner, or a combination of inclined surfaces that are inclined at different angles, curved surfaces that have different curvatures, or an inclined surface and a curved surface. Moreover, the region R23 of the protruding portion 21 and the region R23 of the protruding portion 22 may be formed by the discharge promoting surfaces 21y and 22y that are different from each other.

Similarly, the protruding portions 23 and 24 have the inner circumferential surfaces 23x and 24x that are to be opposed to the low-voltage pipe 12, first end portions P4, and second end portions P6. The protruding portions 23 and 24 are formed such that the heights of the inner circumferential surfaces 23x and 24x in the vertical direction continuously decrease from the first end portions P4 to the second end portions P6 in the state in which the wire harness W is installed in the vehicle V. The first end portions P4 are each located at about a 9 o'clock position in a front view, and the second end portions P6 are each located at about a half-past-five position, which is passes a 6 o'clock position in the counterclockwise direction, in a front view. Moreover, the inner circumferential surfaces 23x and 24x of the protruding portions 23 and 24 each include, between the first end portion P4 and the second end portion P6, an intermediate position P5 that is opposed to the lowermost portion of the low-voltage pipe 12, in the state in which the wire harness W is installed in the vehicle V. The intermediate position P5 is located at about a 6 o'clock position in a front view.

In each of the inner circumferential surfaces 23x and 24x of the protruding portions 23 and 24, a region R45 between the first end portion P4 and the intermediate position P5 is formed by an ark that corresponds to the outer circumference of the low-voltage pipe 12. On the other hand, in each of the inner circumferential surfaces 23x and 24x of the protruding portions 23 and 24, a region R56 between the intermediate position P5 and the second end portion P6 is formed by a discharge promoting surface 23y or 24y whose height in the vertical direction continuously decreases from the intermediate position P5 to the second end portion P6. The regions R56 that correspond to the discharge promoting surfaces 23y and 24y each may be formed by an inclined surface whose height in the vertical direction decreases linearly, a curved surface whose height in the vertical direction decreases, for example, in a quadratic curve manner, or a combination of inclined surfaces that are inclined at different angles, curved surfaces that have different curvatures, or an inclined surface and a curved surface. Moreover, the region R56 of the protruding portion 23 and the region R56 of the protruding portion 24 may be formed by the discharge promoting surfaces 23y and 24y that are different from each other.

The following describes an operation for attaching the clamp 10 to the high-voltage pipe 11 and the low-voltage pipe 12.

First, while an attachment jig is used to support the high-voltage pipe 11, a predetermined portion of the high-voltage pipe 11 is introduced into the housing portion 31 through the opening portion 31a in a lateral direction that may be a radial direction intersecting the longitudinal direction of the high-voltage pipe 11. Then, the lid portion 32 is locked to the housing portion 31 using a snap-fit structure, for example. At this time, the stabilizer portions 33 and 34 elastically hold the high-voltage pipe 11 (see FIG. 6). Thereafter, the tape 71 is wound around the high-voltage pipe 11 and the protruding portion 21 together to fix the high-voltage pipe 11 to the protruding portion 21, and in addition, the tape 71 is fastened with the binding band 61. Similarly, the tape 72 is wound around the high-voltage pipe 11 and the protruding portion 22 together to fix the high-voltage pipe 11 to the protruding portion 22, and in addition, the tape 72 is fastened with the binding band 62.

Moreover, the tapes 73 and 74 are wound around and fixed to predetermined portions of the low-voltage pipe 12 in advance. The predetermined portions of the low-voltage pipe 12 around which the tape 73 and the tap 74 are wound may also be referred to as "taping regions". Next, while the predetermined portion around which the tape 73 is wound is brought close to the protruding portion 23 and the predetermined portion around which the tape 74 is wound is brought close to the protruding portion 24, the low-voltage pipe 12 is introduced into the housing portion 51 through the opening portion 51a in a lateral direction that may be a radial direction intersecting the longitudinal direction of the low-voltage pipe 12. Then, the lid portion 52 is locked to the housing portion 51 using a snap-fit structure, for example. At this time, the stabilizer portions 53 and 54 elastically hold the low-voltage pipe 12 (see FIG. 6). Thereafter, the protruding portion 23 and the low-voltage pipe 12 are fastened together with the binding band 63 at the position at which the wound tape 73 is located so as to press the tape 73 against the protruding portion 23. Similarly, the protruding portion 24 and the low-voltage pipe 12 are fastened together with the binding band 64 at the position at which the wound tape 74 is located so as to press the tape 74 against the protruding portion 24.

In this manner, the operation for attaching the clamp 10 to the high-voltage pipe 11 and the low-voltage pipe 12 is completed (see FIG. 2).

Figure 7:
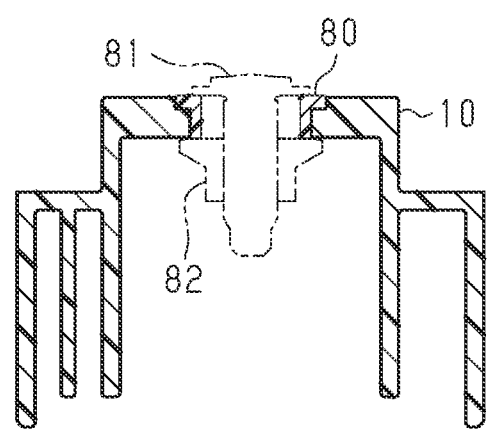
FIG. 7 is a cross-sectional view illustrating the clamp taken along line 7-7 in FIG. 4.

Then, after the completion of the above-mentioned operation, the clamp 10 is fixed to the fixing target on the vehicle body or the like by fastening a bolt 81 and a nut 82 through a collar 80 provided in the clamp 10 as shown in FIG. 7, and thus the wire harness W is installed in the vehicle V. At this time, the pipes 11 and 12 are fixed to the protruding portions 21 to 24 using the tape 71 to 74 and the bands 61 to 64 together, and thus the effect of suppressing the sliding of the pipes 11 and 12 is improved. Therefore, even if rotating force acts on the pipes 11 and 12, the rotation of the pipes 11 and 12 is restricted, and thus the attachability to the vehicle V is improved.

As described above, with these embodiments, the following functions and effects can be exhibited.

(1) Since the tapes 73 and 74 that each have a surface that is less likely to slide against the clamp 10 are wound onto and fixed to the outer circumferential surface of the low-voltage pipe 12, and the clamp 10 is attached so as to come into contact with the surfaces of the tapes 73 and 74, the effect of suppressing the sliding of the low-voltage pipe 12 against the clamp 10 can be improved compared with the case where the clamp 10 is attached directly to the surface of the low-voltage pipe 12.

(2) When vinyl tape in which the surface layer L1*a* contains polyvinyl chloride as the main component is used as the tapes 73 and 74, the surfaces of the tapes 73 and 74 are less likely to slide against the clamp 10, and favorable stretchability and excellent hand-tearability can be imparted to the tapes 73 and 74, due to polyvinyl chloride. Accordingly, sufficient frictional force can be applied to the clamp 10, and the ease of attaching the tapes 73 and 74 can be improved when the tapes 73 and 74 are wound onto and fixed to the outer circumferential surface of the low-voltage pipe 12.

(3) When the low-voltage pipe 12 is fixed to the protruding portions 23 and 24, the portions for generating friction are exposed from the main body 20, and therefore, measures to improve the frictional force by using a member separate from the lid portion 52 and the stabilizer portions 53 and 54 need to be taken.

Accordingly, as such measures to improve the frictional force, the protruding portions 23 and 24 and the low-voltage pipe 12 are fastened together with the binding bands 63 and 64 to press the tapes 73 and 74 against the protruding portions 23 and 24. Thus, the frictional force of the tapes 73 and 74 against the protruding portions 23 and 24 of the clamp 10 can be improved, and the effect of suppressing the sliding of the low-voltage pipe 12 against the clamp 10 can be improved.

(4) Since the binding bands 63 and 64 are less likely to be stretched than tape, and can maintain the fastening state produced by mechanical locking, deterioration thereof is less likely to affect the fastening force compared with tape that maintains a fastening state by its stickiness. Moreover, the binding bands 63 and 64 need not be rotated around the low-voltage pipe 12 many times unlike rolled-up tape, and thus a small work space is sufficient for where harness assembly is performed.

(5) The binding bands 63 and 64 can be locked to the projections 23*a* and 24*a*, namely it is possible to restrict the binding bands 63 and 64 from moving from appropriate positions, and therefore, the sliding-suppressing effect of the clamp 10 caused by the tapes 73 and 74 can be maintained to suppress the rotation of the low-voltage pipe 12 till the low-voltage pipe 12 is attached to the vehicle V. Moreover, the area of contact between the tapes 73 and 74 and the protruding portions 23 and 24 can be secured by providing the projections 23*a* and 24*a* on a side opposite to the surface to be opposed to the low-voltage pipe 12.

(6) When the clamp 10 holds the high-voltage pipe 11 and the low-voltage pipe 12 that are arranged side by side, measures to more reliably suppress the rotation of the high-voltage pipe 11, which is relatively heavy because it is used for high-voltage electric wires, need to be taken. Based on this, tape serving as the tapes 71 and 72 is wound around the high-voltage pipe 11 and the protruding portions 21 and 22 together to fix the high-voltage pipe 11 to the protruding portions 21 and 22, thus making it possible to more reliably suppress the rotation of the high-voltage pipe 11. That is, regarding the pipes 11 and 12 that are arranged side by side, the rotation of the high-voltage pipe 11, which is heavier, relative to the clamp 10 is more reliably suppressed as described above, and the effect of suppressing the rotation of the low-voltage pipe 12, which is lighter, relative to the clamp 10 is obtained by winding the tapes 73 and 74 onto the outer circumferential surface thereof and bringing the surfaces of the tapes 73 and 74 into contact with the protruding portions 23 and 24. One of the technical significances of this embodiment is that, when the pipes 11 and 12 are arranged side by side as described above and thus come close to each other, the way of winding tape is varied depending on the weights of the pipes 11 and 12 and objects to be housed therein.

(7) Since the tapes 71 and 72 are wound around the high-voltage pipe 11 and the protruding portions 21 and 22 together to fix the high-voltage pipe 11 to the protruding portions 21 and 22, there is a concern that the high-voltage pipe 11 rotates if the tapes 71 and 72 themselves are stretched. In this respect, using tapes 71 and 72 having low stretchability makes it possible to improve the effect of suppressing the rotation of the high-voltage pipe 11.

(8) Since acetate tape that includes the fabric layer L2*a* containing acetate fibers as the main component is used as the tapes 71 and 72, elongation resistance and flexibility are imparted to the tapes 71 and 72 due to the acetate fibers. Accordingly, the rotation of the high-voltage pipe 11 can be further suppressed, and the ease of attaching the tapes 71 and 72 can be improved.

(9) Since the tapes 71 and 72 are fastened with the binding bands 61 and 62, the high-voltage pipe 11 can be further kept from rotating by such fastening, and in addition, the separation of the tapes 71 and 72 is suppressed, thus making it possible to maintain the rotation suppressing effect caused by the tapes 71 and 72.

(10) Since the binding bands 61 and 62 are less likely to be stretched than tape, and can maintain the fastening state produced by mechanical locking, deterioration thereof is less likely to affect the fastening force compared with tape that maintains a fastening state by its stickiness. Accordingly, the durability of the wire harness W can be improved.

(11) The binding bands 61 and 62 can be locked to the projections 21*a* and 22*a*, namely it is possible to restrict the binding bands 61 and 62 from moving from appropriate positions, and therefore, the fixation effect caused by the tapes 71 and 72 can be maintained to suppress the rotation of the high-voltage pipe 11, for example, till the high-voltage pipe 11 is attached to the vehicle V. Moreover, the area of contact between the high-voltage pipe 11 and the protruding portions 21 and 22 can be secured by providing the projections 21*a* and 22*a* on a side opposite to the surface to be opposed to the high-voltage pipe 11.

(12) In most cases, the high-voltage electric wire 1 includes a core wire having a large cross-sectional area in order to suppress heat generation when an electric current flows therethrough, and thus the outer diameter of the high-voltage electric wire 1 is likely to be larger than that of the low-voltage electric wire 2. That is, in most cases, the high-voltage electric wire 1 is heavier than the low-voltage electric wire 2, and therefore, the technical significance described in (6) above can be achieved, for example, by arranging the high-voltage electric wire 1 in the high-voltage pipe 11 because the effect of suppressing the rotation of the high-voltage pipe 11 is improved by winding tape serving as the tapes 71 and 72 around the high-voltage pipe 11 and the protruding portions 21 and 22 together.

(13) The technical significance described in (6) above can be achieved, for example, by improving the effect of suppressing the rotation of the high-voltage pipe 11 having a larger outer diameter, in other words, a pipe in which a heavy object such as the high-voltage electric wire 1 or a large number of electric wires can be housed.

It should be noted that the embodiments mentioned above can be implemented with various modifications as follows. The embodiments mentioned above and the following modified examples can be used in combination with each other as long as they are technically compatible with each other.

At least one of the protruding portions 23 and 24 may be omitted from the wire harness W as long as the first tape member (e.g., vinyl tape) is wound onto the outer circumferential surface of the low-voltage pipe 12, and the surface of the first tape member and the tubular portion 50 (e.g., a clamping portion formed by the stabilizer portions 53 and 54 and the lid portion 52) are in contact with each other.

The tapes 73 and 74 are not limited to vinyl tape, and any tape can be used as long as it is less likely to slide against the clamp 10 than the surface of the low-voltage pipe 12.

At least one of the binding bands 63 and 64 may be omitted from the wire harness W as long as the surfaces of the tapes 73 and 74 wound onto the outer circumferential surface of the low-voltage pipe 12 are in contact with the clamp 10 (e.g., the protruding portions 23 and 24), and thus the effect of suppressing the sliding of the low-voltage pipe 12 is satisfactorily obtained.

The first fastening member is not limited to the binding bands 63 and 64, and any member can be used as long as it presses the tapes 73 and 74 against the protruding portions 23 and 24.

It is preferable that the protruding portions 23 and 24 include the projections 23a and 24a from the viewpoint of restricting the binding bands 63 and 64 from moving appropriate positions, but the projections 23a and 24a may be omitted.

At least one of the protruding portions 21 and 22 may be omitted from the wire harness W as long as the rotation of the high-voltage pipe 11 can be satisfactorily suppressed by the tubular portion 30 (e.g., a clamping portion formed by the stabilizer portions 33 and 34 and the lid portion 32).

The tapes 71 and 72 are not limited to acetate tape, and any tape having lower stretchability than the tapes 73 and 74 can be favorably used to fix the heavy high-voltage pipe 11 to the protruding portions 21 and 22.

The binding bands 61 and 62 may be omitted from the wire harness W as long as the effect of suppressing the rotation of the high-voltage pipe 11 is satisfactorily obtained by winding the tapes 71 and 72 around the high-voltage pipe 11 and the protruding portions 21 and 22 together.

The second fastening member is not limited to the binding bands 61 and 62, and any member can be used as long as the tapes 71 and 72 are fastened therewith.

It is preferable that the protruding portions 21 and 22 include the projections 21a and 22a from the viewpoint of restricting the binding bands 61 and 62 from moving appropriate positions, but the projections 21a and 22a may be omitted.

The first electric wire is not limited to the low-voltage electric wire 2 and may be a high-voltage electric wire.

The second electric wire is not limited to the high-voltage electric wire 1 and may be a low-voltage electric wire. Moreover, the second electric wire and the second tubular member may be omitted as long as the wire harness W includes a clamp for holding the first tubular member in which the first electric wire is housed.

The second tubular member in which the second electric wire is to be housed need not necessarily have a larger outer diameter than the first tubular member in which the first electric wire is to be housed. The outer diameters of the first tubular member and the second tubular member may be determined depending on the outer diameters and the number of electric wires to be housed therein.

The first tubular member need not be necessarily made of a metal, and may be made of a resin.

The second tubular member need not be necessarily made of a metal, and may be made of a resin. However, it is preferable that the second tubular member is made of a metal when the high-voltage electric wire 1 is to be housed therein. That is, metals are heavier than resins, and even have an electromagnetic shielding function. The high-voltage electric wire 1 generates higher electromagnetic noise than the low-voltage electric wire 2, and therefore, it is preferable that the high-voltage electric wire 1 is housed in the second tubular member having an electromagnetic shielding function from the viewpoint of efficiently shielding electromagnetic noise generated by the wire harness W. Accordingly, it is preferable that the rotation of a tubular member that is heavier and in which a heavy object can be housed is more effectively suppressed.

Figure 10:
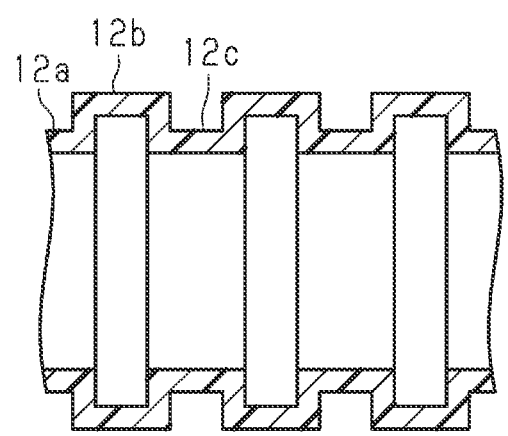
FIG. 10 is a schematic cross-sectional view of a pipe of a modified example.

The first tubular member is not limited to the low-voltage pipe 12 made of a metal. The first tubular member may be a corrugated tube 12a as shown in FIG. 10 that is made of a resin, for example, and is formed in a bellows shape in which ridge portions 12b and valley portions 12c are alternately repeated. The area of contact between the corrugated tube 12a and the clamp 10 decreases compared with that between a tubular member such as the low-voltage pipe 12 with a smooth outer circumferential surface and the clamp 10, and thus the corrugated tube 12a is likely to rotate relative to the clamp 10. Accordingly, the rotation of the corrugated tube 12a relative to the clamp 10 can be suppressed by winding the tape member (e.g., the tapes 73 and 74) having a surface that is less likely to slide against the clamp 10 than the surface of the corrugated tube 12a onto the outer circumferential surface of the corrugated tube 12a.

At least one of the protruding portions 21 to 24 may be provided with a projection that is to be fitted into a hole formed in the corresponding high-voltage pipe 11 or low-voltage pipe 12. With this configuration, the effect of suppressing the rotation of the high-voltage pipe 11 or low-voltage pipe 12 can be improved by fitting the projection provided on at least one of the protruding portions 21 to 24 into the hole formed in the high-voltage pipe 11 or low-voltage pipe 12. It is preferable that at least either of the protruding portions 21 and 22 that correspond to the high-voltage pipe 11 is provided with a projection, and at least either of the protruding portions 23 and 24 that correspond to the low-voltage pipe 12 is provided with a projection. The reason for this is that the effect of restricting the rotation can be improved for each of the pipes 11 and 12. Whichever configuration is employed, a hole is formed in the high-voltage pipe 11 or low-voltage pipe 12, and therefore, it is preferable to provide a water sealing structure on the hole portion.

The rotation of the tubular member relative to the clamp can be referred to as relative rotation between the clamp and the tubular member in a direction intersecting the longitudinal direction of the tubular member. The sliding of the tubular member against the clamp can be referred to as sliding between the inner circumferential surface of the clamp and the outer circumferential surface of the tubular member. This sliding can be referred to as sliding of the inner circumferential surface of the clamp in a direction intersecting the longitudinal direction of the tubular member from the viewpoint of restricting the rotation of the tubular member relative to the clamp.

The pipes 11 and 12 each may include a linear portion and may also include a bent portion. The linear portions of the pipes 11 and 12 are cylinders. The clamp 10 is configured to be attached to the linear portions of the pipes 11 and 12, bridge the linear portion of the pipe 11 and the linear portion of the pipe 12, and hold the linear portion of the pipe 11 and the linear portion of the pipe 12 such that these portions are spaced apart from each other at a predetermined interval. In the example shown in the diagram, the clamp 10 is configured to keep the linear portion of the pipe 11 and the linear portion of the pipe 12 substantially parallel with each other. A configuration can be employed in which the clamp 10, the linear portion of the pipe 11, and the linear portion of the pipe 12 are arranged or extend in the same plane, for example. The clamp 10 can be advantageously used to form a low-profile wire harness W that includes a plurality of pipes by reducing the thickness thereof, for example.

The tape 73 may also be referred to as adhesive tape that has an adhesive surface and an anti-slip surface on a side opposite to the adhesive surface. The adhesive surface is configured to adhere to the outer circumferential surface of the pipe 12. The anti-slip surface is configured to come into areal contact with the concave curved surface of the protruding portion 23 and the inner circumferential surface of the binding band 63. The adhesive surface of the tape 73 is provided by the sticky layer L1b. The anti-slip surface of the tape 73 is provided by the surface layer L1a. The adhesive surface of the tape 73 is configured to suppress or prevent the movement of the adhesive surface, which is the inner circumferential surface of the tape 73, relative to the outer circumferential surface of the pipe 12. The anti-slip surface of the tape 73 is configured to suppress or prevent the movement of the anti-slip surface, which is the outer circumferential surface of the tape 73, relative to the inner circumferential surface of the binding band 63, and the movement of the outer circumferential surface of the tape 73 relative to the concave curved surface of the protruding portion 23.

The anti-slip surface of the tape 73 may be a smooth even surface. The same applies to the tape 74.

The tape 73 may be wound around only a region with a predetermined length that corresponds to the clamp 10 (particularly the protruding portions 23 and 24) in the entire pipe 12. The pipe 12 may include taping regions that correspond to the regions with a predetermined length around which the tapes 73 and 74 are wound, and a non-taping region that is a region other than the above-mentioned regions with a predetermined length around which the tapes 73 and 74 are not wound. The taping region of the pipe 12 may have a length that is shorter than or equal to the protruding length of the protruding portion 23. The same applies to the tape 74. The tapes 73 and 74 may slightly reduce the heat dissipation properties of the pipe 12, but the pipe 12 in which the tapes 73 and 74 are wound around only the regions with a predetermined length can maintain relatively high heat dissipation properties.

The protruding portion 23 of the clamp 10 may be a tongue-shaped projection having a concave curved surface that corresponds to or conforms to the outer circumferential surface of the corresponding pipe 12. The protruding portion 23 may have a convex curved surface on a side opposite to the concave curved surface. The same applies to the other protruding portions 21, 22, and 24.

The projection 23a may also be referred to as a fastening member stopper that is configured to suppress detachment of the binding band 63 from the protruding portion 23. The same applies to the protruding portion 24a.

The projection 21a may also be referred to as a tape stopper that is configured to suppress displacement of the tape 71 relative to the protruding portion 21, or suppress partial or overall detachment of the tape 71 from the protruding portion 21. The same applies to the projection 22a.

In the example shown in FIG. 6, the clamp 10 can be configured as a single product made of a synthetic resin. The clamp 10 may be configured as an assembly of a plurality of parts.

The following describes technical ideas that can be understood from the embodiments and modified examples above.

Supplementary Note 1: A wire harness,
wherein the main body includes a first tubular portion in which the first tubular member is housed, and a base portion that is adjacent to the first tubular portion,
the first tubular portion includes a first housing portion provided with a first opening portion through which the first tubular member is introduced, and a first lid portion for covering the first opening portion, and
the first protruding portion protrudes in a longitudinal direction of the first tubular member from a portion of the first housing portion that is continuous with the base portion.

With this configuration, the strong base portion can receive vibration of the first tubular member through the first protruding portion. It should be noted that the tubular portion 50 corresponds to an example of the first tubular portion, the housing portion 51 corresponds to an example of the first housing portion, and the lid portion 52 corresponds to an example of the first lid portion.

Supplementary Note 2: A wire harness,
wherein the main body includes a second tubular portion in which the second tubular member is housed, and a base portion that is adjacent to the second tubular portion, the second tubular portion includes a second housing portion provided with a second opening portion through which the second tubular member is introduced, and a second lid portion for covering the second opening portion, and the second protruding portion protrudes in a longitudinal direction of the second tubular member from a portion of the second housing portion that is continuous with the base portion.

With this configuration, the strong base portion can receive vibration of the second tubular member through the second protruding portion. It should be noted that the tubular portion 30 corresponds to an example of the second tubular portion, the housing portion 31 corresponds to an example of the second housing portion, and the lid portion 32 corresponds to an example of the second lid portion.

Supplementary Note 3: A wire harness according to one or more implementation examples of the present disclosure may include an electric wire, a cylindrical pipe that includes a linear portion and a cylindrical outer circumferential surface and in which the electric wire is housed, a clamp that has a concave curved surface that corresponds to or conforms to the cylindrical outer circumferential surface of the cylindrical pipe, and holds the linear portion of the cylindrical pipe, and adhesive tape that is wound around a range with a predetermined length of the linear portion of the cylindrical pipe, the adhesive tape may have an adhesive surface configured to adhere to the cylindrical outer circumferential surface of the linear portion of the cylindrical pipe and an anti-slip surface on a side opposite to the adhesive surface, and the anti-slip surface can be configured to come into areal contact with the concave curved surface of the clamp.

Supplementary Note 4: The clamp may include a tongue-shaped projection that protrudes in a longitudinal direction of the cylindrical pipe, and the tongue-shaped projection may have the concave curved surface and a convex curved surface on a side opposite to the concave curved surface.

Supplementary Note 5: The wire harness can further include a fastening band, and the fastening band can be configured to be wound around the tongue-shaped projection and the adhesive tape from the outside of the cylindrical pipe, come into areal contact with the convex curved surface of the tongue-shaped projection and the anti-slip surface of the adhesive tape, and fasten the tongue-shaped projection and the adhesive tape to the cylindrical pipe.

Supplementary Note 6: The clamp can be configured to be attached to the cylindrical pipe in a lateral direction that intersects the longitudinal direction of the cylindrical pipe.

The invention claimed is:

1. A wire harness comprising:
a first electric wire;
a first tube in which the first electric wire is housed;
a clamp that holds the first tube;
a first tape having a surface that is less likely to slide against the clamp than a surface of the first tube, wherein the clamp is brought into contact with the first tape that is wound onto and fixed to an outer circumferential surface of the first tube, and is attached thereto;
a second electric wire;
a second tube in which the second electric wire is housed; and
a second tape having lower stretchability than the first tape, wherein the second tube is fixed to the clamp by the second tape that surrounds the second tube and the clamp together.

2. The wire harness according to claim 1, wherein:
the first tape has a surface layer that comes into contact with the clamp, and
the surface layer contains polyvinyl chloride as a main component.

3. The wire harness according to claim 1, wherein:
the clamp includes a main body in which the first tube is housed, and a first protrusion that protrudes from the main body in a longitudinal direction of the first tube, and
the wire harness further includes a first fastener with which the first protrusion and the first tube are fastened together to press the first tape against the first protrusion.

4. The wire harness according to claim 3, wherein the first fastener is a binding band.

5. The wire harness according to claim 3, wherein the first protrusion has a first projection on a side opposite to a side opposed to the first tube.

6. The wire harness according to claim 3,
wherein:
the clamp includes a second protrusion that protrudes from the main body in a longitudinal direction of the second tube, and
the second tube is fixed to the second protrusion by winding the second tape around the second tube and the second protrusion together.

7. The wire harness according to claim 6, wherein the second tape includes a fabric layer that contains acetate fibers as a main component.

8. The wire harness according to claim 6, further comprising a second fastener with which the second tape is fastened.

9. The wire harness according to claim 8, wherein the second fastener is a binding band.

10. The wire harness according to claim 8, wherein the second protrusion has a second projection on a side opposite to a side opposed to the second tube.

11. The wire harness according to claim 6, wherein the first electric wire is a low-voltage electric wire, and the second electric wire is a high-voltage electric wire.

12. The wire harness according to claim 6, wherein the second tube has a larger outer diameter than the first tube.

13. The wire harness according claim 6, wherein the first tube is made of a resin, and the second tube is made of a metal.

14. The wire harness according to claim 1, wherein the first tube is a corrugated tube formed in a bellows shape in which ridges and valleys are alternately repeated.

15. The wire harness according to claim 1, wherein the second tape includes a fabric layer that contains acetate fibers as a main component.

16. The wire harness according to claim 1, wherein a main component of the first tape is different from a main component of the second tape.

17. The wire harness according to claim 16, wherein the second tube has a larger outer diameter than the first tube.

* * * * *